Patented Apr. 9, 1929.

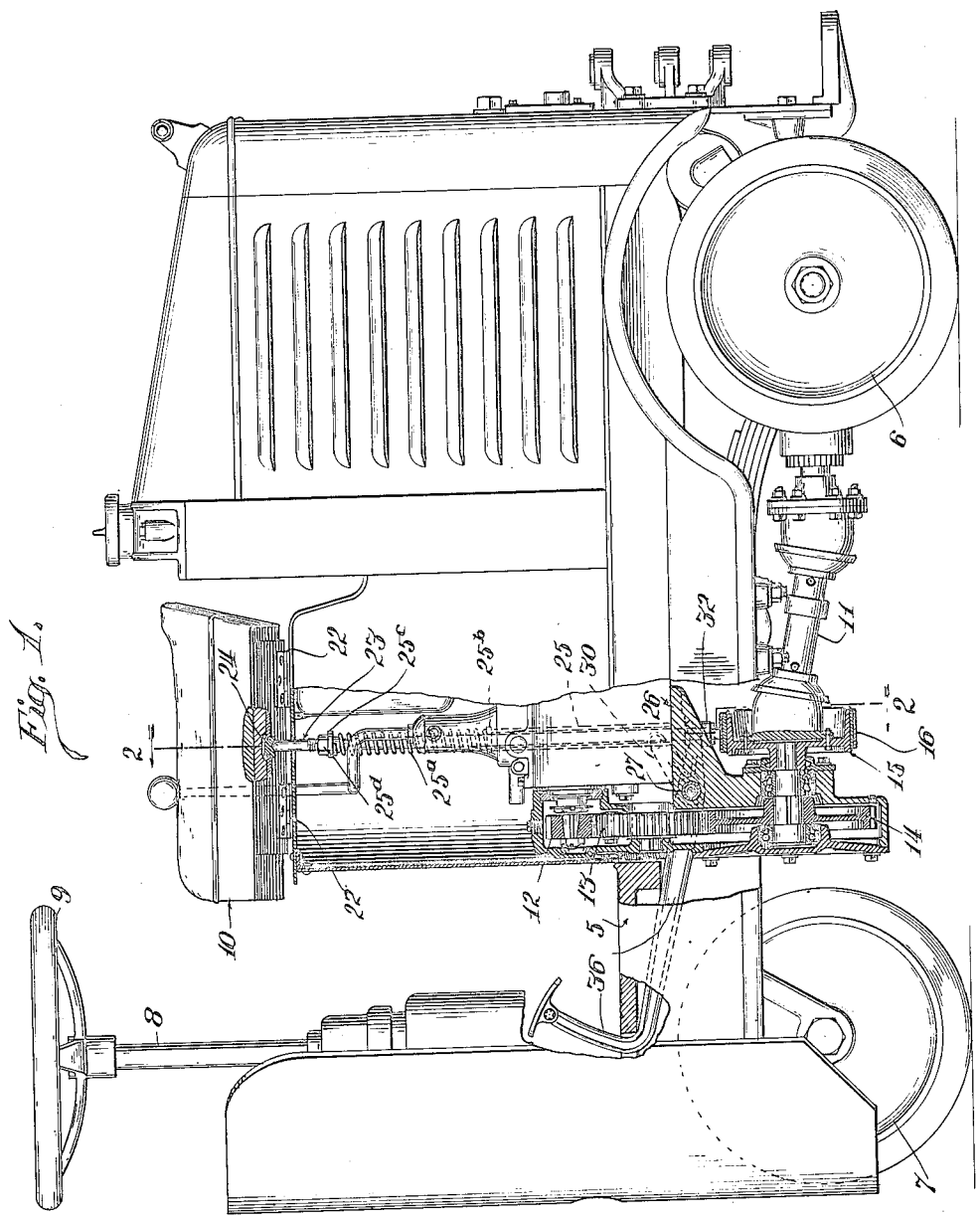

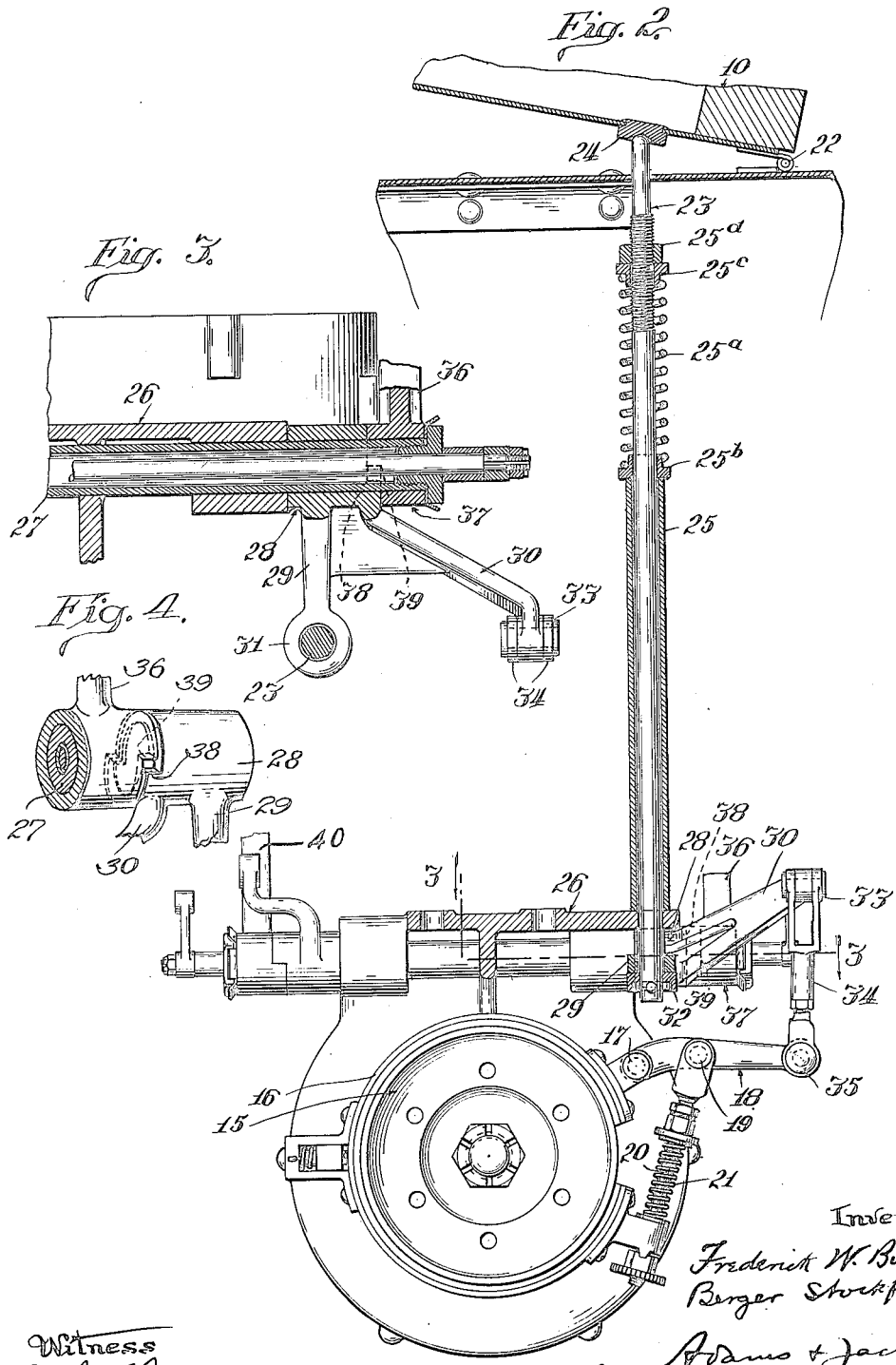

1,708,009

UNITED STATES PATENT OFFICE

FREDERICK W. BURGER, OF NILES, AND BERGER STOCKFLETH, OF BERRIEN SPRINGS, MICHIGAN, ASSIGNORS TO CLARK TRUCTRACTOR COMPANY, OF BUCHANAN, MICHIGAN, A CORPORATION OF MICHIGAN.

VEHICLE BRAKE-OPERATING MEANS.

Application filed December 31, 1923. Serial No. 683,722.

This invention relates to improvements in means for controlling the application of a brake carried by a vehicle, and more particularly the application of a brake-band to a drum that is secured upon a member of the propeller shaft of a small tractor such as are commonly employed in and about shops, railway stations and other places for pushing or pulling from place to place trucks used for the transportation of articles of various kinds. The object of the invention is to provide improved and simple means for causing the automatic setting or applying of the brake immediately upon the driver or operator's leaving his seat, and which will also release the brake whenever such seat is occupied. We attain this object by the construction and arrangement of parts shown in the drawings and hereinafter described. What is believed to be new will be set forth in the claims.

In the drawings,—

Fig. 1 is a view in side elevation, with some parts in vertical section and some parts partially broken away, of a shop tractor provided with our improvements;

Fig. 2 is a vertical section taken substantially on line 2—2 of Fig. 1;

Fig. 3 is a horizontal section taken substantially on line 3—3 of Fig. 2; and

Figure 4 is a fragmentary perspective view showing the lost motion connection between the clutch pedal and the swinging lever, as viewed from the bottom thereof.

Referring to the several figures of the drawings,—5 indicates the frame of the chassis of a shop tractor, which tractor may be of any desired construction. As here shown, the frame is supported upon rear wheels, one of which appears in Fig. 1 and is indicated by 6, and by a front dirigible wheel 7, which latter is controlled through a steering post 8, upon the upper end of which is mounted an ordinary steering wheel 9. Upon the frame 5 is a housing which encloses the motor and other operating parts, and upon the forward portion of the frame is mounted the operator's seat, which is here indicated by 10. The mounting of such seat and the connections from it to the braking mechanism will be hereinafter described. As here shown, a sectional propeller shaft 11, the sections of which are connected as usual by universal couplings, is employed to drive the machine through the intervention of an ordinary differential mechanism on the rear axle. In the construction illustrated this propeller shaft is driven by a train of gearing comprising a pinion 12 fast on the end of a shaft driven by the motor and meshing with an idler gear 13 that in turn meshes with another gear 14 fast on one member of the said propeller shaft. Inasmuch as our invention may be used in connection with motor vehicles of very different constructions, it is not deemed necessary to further describe the vehicle that is shown.

Upon the propeller shaft is keyed or otherwise securely affixed a brake drum 15, around which extends an ordinary brake-band 16, as usual, and to one end of such band there is pivotally connected at 17 a lever 18, which lever intermediately of its ends has pivotally connected to it at 19 a rod 20 which is connected in any usual manner with the other end of the brake-band. It is obvious that with this construction of braking means an upward pull on the outer end of the lever 18 will set or apply the brake. Around the rod 20 is arranged a strong coiled spring 21 which normally tends to hold the brake-band more positively out of engagement with the drum. The brake construction here shown is of a well known type.

For actuating the lever 18 to draw the brake-band into frictional engagement with the drum, we provide two separate means, one adapted to act automatically when the operator leaves his seat, and the other adapted to be operated at will by the operator while in his seat. The seat 10 is hinged to the casing upon which it is mounted by one or more longitudinally extending hinges 22, such hinges being applied in the construction shown to the under side of the seat adjacent to one side thereof so that such seat may swing up and down about an axis that extends longitudinally of the vehicle, instead of about a transverse axis as has heretofore been the practice in seat-operated braking means—the advantage of which sidewise hinging will be hereinafter referred to. Projecting through the upper wall of the casing that the seat is hinged to is a heavy rod 23 that at its upper end bears against a block 24 carried by the seat, the under face of the block being preferably hollowed out to receive the rounded upper end of such rod, as shown in Fig. 2. This rod for the greater portion of its length is surrounded by a hollow standard 25 through which the rod is free to move up and down. In the construction shown the hollow standard is mounted upon the web or horizontal portion 26 of a heavy casting that partially encloses the driving gears that have been referred to, as shown in Fig. 1. Around that portion of the rod that projects above the hollow standard is a strong coiled spring 25ᵃ that bears at its lower end against a cap 25ᵇ on the upper end of the standard, and at its upper end against a similar cap 25ᶜ on the rod. The rod for a portion of its length is screw-threaded, as shown in Fig. 2, and upon that portion is screwed a nut 25ᵈ against which the cap 25ᶜ bears, and it will be evident that by turning such nut the tension of the spring 25ᵃ may be regulated as desired. The effect of the spring of course is to force the rod 23 upward, and consequently when the seat is not occupied to turn such seat on its hinges into substantially the position shown in Fig. 2. Secured in the end portions of the heavy casting referred to is a comparatively long sleeve 27 which lies beneath the web or plate member of the casting 26 near the forward edge thereof, and journaled upon such sleeve is a collar 28 which constitutes a hub for two arms or levers 29 and 30, respectively, and which, as shown, are preferably formed integral with said collar. The arm 29 projects rearwardly, and at its outer end is provided with an eye 31 that lies directly beneath the rod 23, and through which eye such rod loosely passes, a suitable head 32 on the end of the rod preventing it from being drawn up out of said eye. A lost motion connection between the rod 23 and the arm 29 is thus provided. The other arm 30 carried by the hub or collar 28 also projects rearwardly, laterally and upwardly in the construction shown, and at its upper end is pivotally attached at 33 to a short rod 34 that in turn is pivotally connected at 35 with the outer end of the lever 18. 36 indicates a foot pedal, the hub portion 37 of which is also journaled on the sleeve 27 and in contact with the hub 28 that carries the two arms 29, 30. As shown in Figs. 3 and 4, the hub 28 is provided at that end adjacent to the hub of the pedal member referred to with a shoulder 38, and the said hub 37 is provided with a shoulder 39 on its inner end which is adapted to come in contact with the shoulder 38 when the pedal is forced down, and thereby cause a turning of the other hub 28, the two parts constituting in effect clutch members.

With the operator of the machine on the seat 10, the effect of his weight will be to force down the rod 23 against the action of the coiled spring 25ᵃ, and such rod will move down through the eye 31 in the arm 29, and inasmuch as the arm 29 is then unsupported by the head 32 on the end of the rod, it and the other arm 30 will swing down by gravity, and thus the brake-band will be freed from frictional engagement with its drum. If, however, at any time while the operator is on the seat it is desired to apply the brake, a pressure downward of the operator's foot on the pedal 36 will rotate the hub of the pedal and bring it into clutching engagement with the hub or collar 28 that carries the two arms 29, 30, and thus cause such a swinging of the arm 30 as to exert the required pull on the lever 18 to force the brake-band into braking position—the eye 31 of the other arm moving along the rod 23 without any effect on such rod. In view of the curved path of the outer end of the arm, the eye is of course to be sufficiently larger than the diameter of the rod so that no binding between the eye and the rod takes place.

When the operator leaves his seat, the rod 23 will be instantly forced up by the coiled spring 25ᵃ, and by reason of the head 32 on the lower end of such rod coming in contact with the eye 31, the arms 29 and 30 will be swung up independently of the pedal, as will be understood, and the brake-band again tightened upon its drum.

Hinging the operator's seat at one side instead of at the rear, as has heretofore been done, is a feature of very considerable importance, as it has been found that when hinged as here shown it will not tend to rock up and thereby cause a setting of the brake when the operator bears down on the clutch pedal, for example, as readily as when the seat is hinged at the rear, thereby adapting the device, without special adjustment, for use by an operator of lighter weight than would be the case if the seat were hinged at the rear. In the construction shown the clutch pedal referred to is indicated by 40 and is also mounted on the sleeve 27, through which sleeve extends a rock-shaft with which is connected means for controlling the flow of gas, but which feature is not concerned with our present invention.

What we claim as our invention and desire to secure by Letters Patent, is—

1. In combination, a vehicle, a seat pivotally mounted thereon to swing up and down about an axis that extends longitudinally of the vehicle, a clutch pedal operable from said seat, a brake, and means interposed between the brake and seat tending to normally hold the seat in its raised position and set the brake when the seat is raised.

2. In combination, a vehicle, a seat pivotally connected adjacent one of its side margins with the vehicle to swing up and down about an axis that extends longitudinally thereof, a clutch pedal operable from said seat, a brake, lever mechanism connected with the brake, a rigid member extending between said lever mechanism and the seat, and a spring tending to force said seat and rigid member upward to cause a setting of the brake by a movement of said lever mechanism.

3. In a vehicle, the combination with a brake comprising a brake drum, and a brake band cooperating therewith, of brake operating devices comprising a vertically swinging lever having an eye, means actuated by upward movement of said lever to set the brake, a rod movable vertically through said eye and having a collar mounted thereon below said lever, a brake applying spring tending to move said rod upward, and a vertically movable seat disposed over the upper end of said rod and operating by the weight of the occupant to move said rod downward against the tension of said brake applying spring.

4. In a vehicle, the combination with a brake comprising a brake drum, a brake band cooperating therewith, and a brake releasing spring, of brake operating devices comprising a vertically swinging lever having an eye, means actuated by upward movement of said lever to set the brake, a rod movable vertically through said eye and having a collar mounted thereon below said lever, a brake applying spring tending to move said rod upward, a vertically movable seat disposed over the upper end of said rod and operating by the weight of the occupant to move said rod downward against the tension of said brake applying spring, a brake pedal, and clutching devices between said pedal and said lever operating to operatively connect said pedal with said lever.

5. In a motor vehicle, the combination with a propeller shaft and a brake comprising a brake drum connected with said propeller shaft and disposed transversely of the vehicle frame, a brake band co-acting with said brake drum, and a spring tending normally to release the brake, of means for actuating said brake comprising a rearwardly extending lever mounted to swing vertically, means operatively connecting said lever with said brake band, a vertically movable rod having a lost motion connection with said lever and movable upwardly to actuate said lever to set the brake, a spring tending to move said rod upward, a vertically movable seat disposed over the upper end of said rod and operating by the weight of the occupant to move said rod downward against the tension of said brake applying spring, a forwardly extending brake pedal pivotally mounted coaxially with said lever, and clutching devices operating to connect said pedal with said lever.

6. In a vehicle, the combination with a seat mounted to swing vertically, and a brake comprising a brake drum and a brake band cooperating therewith, of a vertically movable rod movable downward under the weight of the occupant of the seat, a brake applying spring tending to move said rod upward to apply the brake and lift the seat, a swinging lever, means actuated by movement of said lever in one direction to set the brake and by movement thereof in the opposite direction to release the brake, a lost motion connection between said rod and said lever operating on upward movement of said rod to actuate said lever to set the brake, and arranged to permit said lever to move toward its brake setting position independently of said rod when the rod is depressed, and a pedal operable to actuate said lever to set the brake independently of upward movement of said rod, said lever being movable to set the brake, independently of said pedal, by upward movement of said rod.

7. In a vehicle, the combination with a seat mounted to swing vertically, and a brake comprising a brake drum and a brake band cooperating therewith, of a vertically movable rod movable downward under the weight of the occupant of the seat, a brake applying spring tending to move said rod upward to apply the brake and lift the seat, a swinging lever, means actuated by movement of said lever in one direction to set the brake and by movement thereof in the opposite direction to release the brake, a lost motion connection between said rod and said lever operating on upward movement of said rod to actuate said lever to set the brake, and arranged to permit said lever to move toward its brake setting position independently of said rod when the rod is depressed, a pedal, and clutching devices between said pedal and said lever arranged to permit said lever to be actuated by said rod independently of said pedal.

8. In a motor vehicle, the combination with a propeller shaft and a brake comprising a brake drum connected with said propeller shaft and disposed transversely of the vehicle frame, and a brake band co-acting with said brake drum, of means for actuating said brake comprising a lever mounted to swing vertically, means operatively connecting said lever with said brake band, and actuated by downward movement of said lever to release the brake, a verically movable rod having a lost motion connection with said lever operating to actuate said lever to set the brake on upward movement of said rod, and permitting said lever to move upwardly independently of said rod, a spring tending to move said rod upward, and a vertically movable seat disposed over the upper end of said rod and operating by the weight of the occupant to move said rod downward against the tension of said spring.

FREDERICK W. BURGER.
BERGER STOCKFLETH.